United States Patent

[11] 3,598,315

[72] Inventor James E. Seymour
Virginia Beach, Va.
[21] Appl. No. 846,072
[22] Filed July 30, 1969
[45] Patented Aug. 10, 1971
[73] Assignee Royster Company
Norfolk, Va.

[54] FLEXIBLE SPARGERS IN APPARATUS FOR PRODUCING AMMONIUM PHOSPHATE FERTILIZERS
7 Claims, 6 Drawing Figs.

[52] U.S. Cl. .................................................. 239/229,
239/242, 239/276, 239/567, 239/568, 239/602
[51] Int. Cl. ........................................................ B05b 3/00
[50] Field of Search .......................................... 239/229,
450, 255, 242, 276, 541, 276

[56] References Cited
UNITED STATES PATENTS
2,531,566 11/1950 Gustafson..................... 239/229
2,608,438 8/1952 McDonald et al. ........... 239/229
3,227,408 1/1966 Reed ............................. 239/276
3,498,543 3/1970 Gilmour ........................ 239/242

Primary Examiner—Lloyd L. King
Attorney—Stoll and Stoll

ABSTRACT: Flexible sparging devices for distributing ammoniating liquids in apparatus for manufacturing ammonium phosphate fertilizer compositions comprising flexible tubing or hose with multiple escape apertures in the walls thereof. The tubing or hose is closed at the end opposite the inlet and at least the inlet end is secured to a fixed support. Such flexible sparging devices provide infinite loci of distribution due to propulsive force of ammonia ejection and the propensity of such spargers to move from areas of higher to lower fluid density.

PATENTED AUG 10 1971  3,598,315

INVENTOR.
JAMES E. SEYMOUR
BY
Stree & Stree
ATTORNEYS

FLEXIBLE SPARGERS IN APPARATUS FOR PRODUCING AMMONIUM PHOSPHATE FERTILIZERS

This invention relates to sparging devices. More particularly the invention relates to flexible sparging devices in apparatus used for the production of ammonium phosphate fertilizer compositions.

In the manufacture of ammonium phosphate fertilizer compositions by reacting ammonia and crude phosphoric acid, it is well known to distribute ammonia, ammoniating solutions, mineral acids, water and steam in the reaction apparatus by means of drilled or slotted pipe-sparging devices which are rigid and fixed with respect to the reaction mass.

In apparatus for the continuous production of ammonium phosphate fertilizers the prior art rigid and fixed spargers have well-known disadvantages. Continuous ammoniators of the inclined rotary drum type have a dam positioned at the discharge end, or at some intermediate point, to maintain a constant bed level of reactants and particulates which, generally, move in a helical path from the feed end to the discharge end of the rotary drum. The fixed sparging devices are usually positioned within the bed of particulates at a point intermediate to the bed surface and the shell or casing of the rotary drum and, moreover, are rigid with respect to the axis of the drum and the bed of particulates. Liquid reactants, such as ammoniating solutions, ammonia, water and steam are distributed by the rigid pipe spargers in the bed of solid phase and acidulated solid phase phosphatic materials producing heat, moisture and a liquid phase of soluble salts. The liquid phase acting at the particulate periphery in conjunction with the mechanical action of the rotating drum causes agglomeration and granulation. However, when "freezing" or deposition of salts and solids occurs, it results in poor distribution of the liquid reactants with respect to one another and the solid phase, extreme zonal plasticity within the drum chamber, excess mechanical drag, and even mechanical stoppage. The salt deposition trouble has been an ever-present problem with the sparging or distribution of anhydrous ammonia because of reactant concentration and low solubility of diammonium phosphate and diammonium sulfate in ammoniacal media.

In the continuous production of fluid suspensions of high analysis grade fertilizers using orthophosphoric acid in the 36—52 percent by weight range of combined nitrogen and phosphorus pentoxide values, stoppages due to salt buildup on the rigid spargers and agitators in the reaction tanks are common. This particular problem is particularly severe with wet process orthophosphoric acid due to the dissolved and suspended impurities contained in the acid that produce phosphorus pentoxide containing compounds that are insoluble in the liquid phase.

Accordingly, it is an object of this invention to provide improved sparging devices that eliminate or minimize the disadvantages of fixed and rigid spargers. It is a further object to provide nonrigid flexible sparging devices. A still further object is to provide chemical reaction vessels provided with flexible sparging devices that tend to move away from areas of high fluid density and toward areas of lower fluid density.

The above and other objects and advantages of the present invention are obtained by employing as distributing spargers flexible tubing or hose closed at the end opposite the inlet and provided with multiple perforations through its walls. For purposes of illustration, but not of limitation, various embodiments of the invention are in the accompanying drawings in which.

Figure 1:
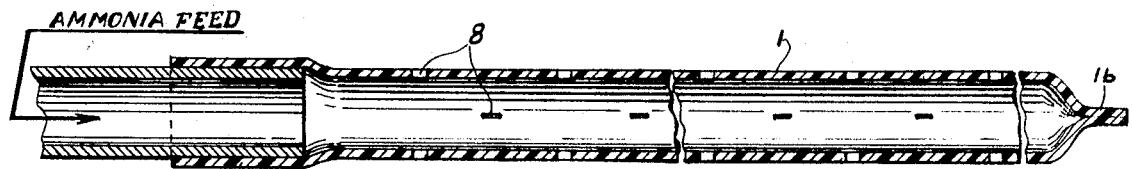
FIG. 1 shows schematically a flexible sparger comprising flexible tubing sealed at the far end and having multiple-slit perforations in its walls.
Figure 2:
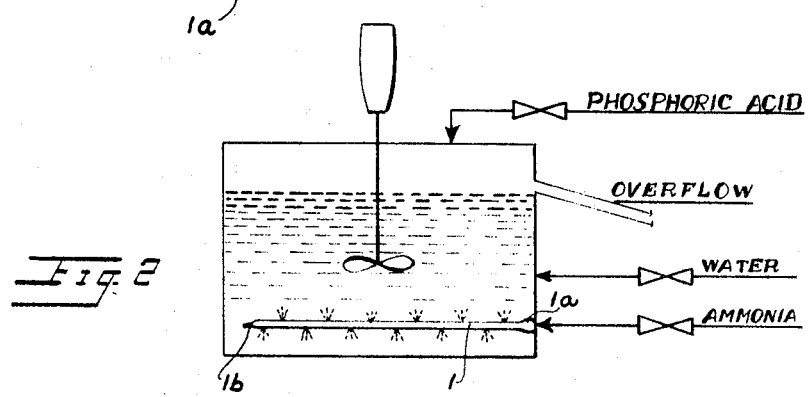
FIG. 2 is a diagrammatical illustration of an ammoniator showing a flexible sparger having its closed end free to move.
Figure 6:
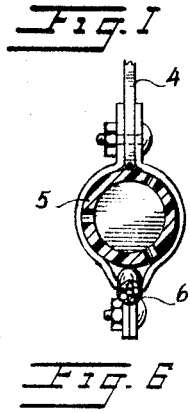
FIG. 6 is an enlarged sectional view taken across line 6-6 of FIG. 4.

As shown in FIGURES 1 and 2, flexible tube sparger 1 may be secured at its open inlet end 1a to a fixed support, e.g., an ammonia feed pipe discharging into a reaction chamber or mixing tank, the opposite end 1b of said tube sparger being closed and free, that is, unsupported by outside means. Free end flexible spargers are particularly useful in liquid systems because they provide infinite loci of distribution due to the propulsive force of anhydrous ammonia ejection coupled with a natural tendency to move from higher to lower fluid density areas.

Figure 3:
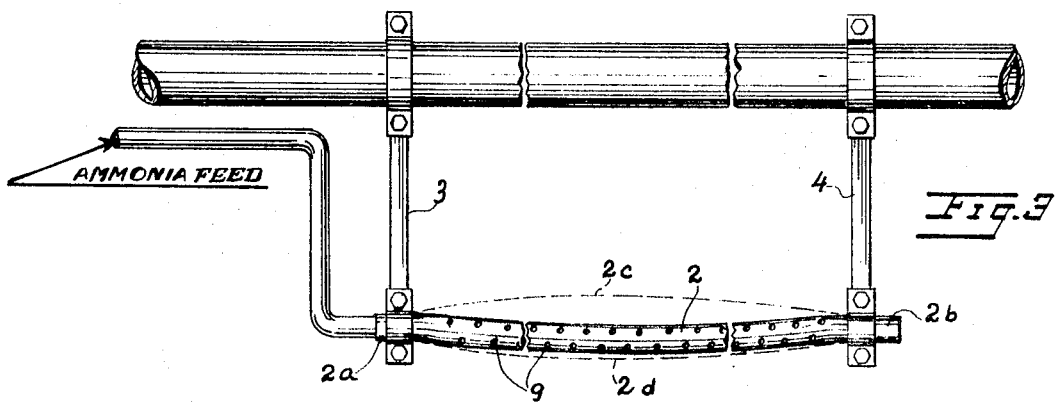
FIG. 3 illustrates a flexible sparger tube having both its inlet and closed ends attached to fixed supports.
Figure 4:
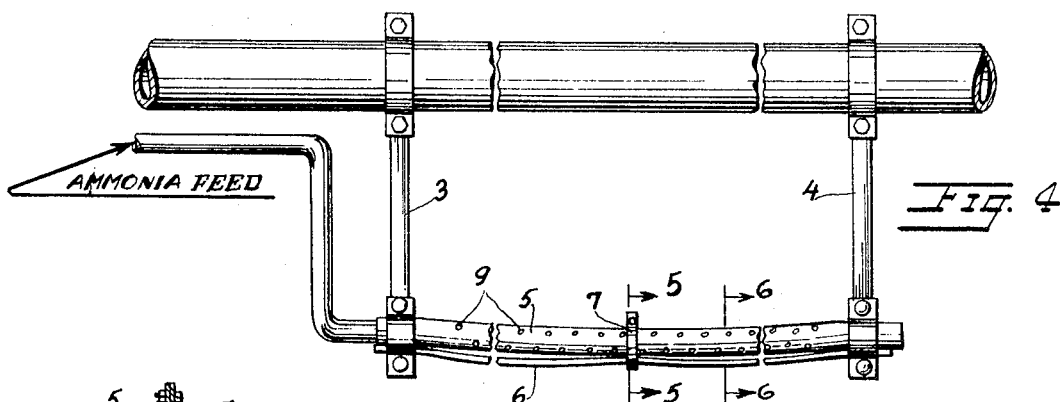
FIG. 4 illustrates a flexible sparger tube banded to a slack limit cable.
Figure 5:
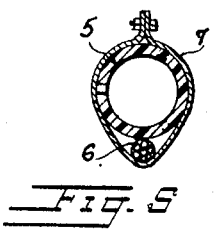
FIG. 5 is an enlarged sectional view taken across line 5-5 of FIG. 4.

Flexible sparging devices having both the inlet and closed ends secured to fixed supports, as shown in FIGURES 3 and 4, are advantageous for dry or dampened particulate ammoniators of the revolving drum type. In revolving drum ammoniators the reactant spargers are normally positioned within the bed of solids. In FIGURE 3 flexible hose sparger 2 is held between fixed supports 3 and 4 which are rigid with respect to the axis of the rotary drum and the bed of particulates. The open inlet end 2a of the hose sparger 2 is secured to the ammonia feed pipe and both the sparger inlet end and the feed pipe are clamped to support 3. A plug closes the opposite end 2b of the hose sparger and enables it to be clamped to support 4. Being anchored at both ends, the flexible hose sparger 2 tends to move or vibrate between dashed lines 2c and 2d.

The vibration pattern indicated in FIGURE 3, while excellent for efficient distribution, puts considerable strain on the hose sparger and tends to twist and degrade it. Additional support may be provided for flexible hose sparger 5 (FIGURE 4) by mounting a relatively slack steel cable 6 between supports 3 and 4 and attaching the hose sparger to the cable. One or more metal bands 7 may be used for this purpose. Both the cable and the bands may be made of suitably chemically resistant stainless steel alloy. Vibration of the hose sparger will be dampened and limited by the supporting cable.

Flexible tubing and hose suitable for the sparging devices of the present invention are well known in the chemical trade and are commercially available. For flexibility, elasticity and chemical resistance, tubing sold under the name "tygon" can be used advantageously. ("Tygon," a vinyl polymer tubing, is the registered trademark of the U. S. Stoneware Co.) For handling larger volumes of liquid, chemically resistant hose manufactured for handling, for example, anhydrous ammonia, is well suited.

The perforations in the walls of the flexible sparger tubing and hose may be in the form of slits cut through the walls or drilled or punched holes. The size and number of perforations varies depending on factors such as internal diameter of the tubing or hose, length of same from the supply inlet to the closed end, viscosity of the liquid and the volume to be distributed per given unit of time. For example, a satisfactory free end flexible sparger for an ammoniator as indicated in FIG. 2 was produced from an 18-inch length of ½-inch-internal-diameter "Tygon" tubing type R 3603, having a wall thickness of about one-sixteenth inch. Four rows of slits evenly spaced around the circumference were cut through the wall, each slit being about one-tenth inches long and spaced an inch apart in each row.

Where greater amounts of liquid to be distributed require tubing or hose of larger internal diameter and greater wall thickness, the apertures can be made by drilling or punching holes through the hose wall. Thus for the fixed ends type of flexible hose sparger shown in FIG. 3 and 4, commercially available anhydrous ammonia hose was used, approximately 2 inches in outside diameter, with a wall thickness of about one-quarter inch. In a length of hose 46 inches between fixed supports, three rows of holes 9, each one-eighth to three-sixteenth inches in diameter, were drilled on 1-inch centers through the wall of the hose to provide 90 apertures in 30 inches of flexible sparger.

The ends of the flexible tube and hose spargers may be closed by well-known techniques. Thus the end of the tube sparger 1 may be heat-sealed or cemented, or otherwise sealed, as shown in Figure 1. For the thicker walled hose sparger, the end may be plugged or capped and banded to provide a tight seal.

It will be understood that changes may be made in the details of construction and arrangement without departing from the spirit of the invention, especially as defined in the following claims. Thus, for example, the apertures in the tubing may be so placed as to result in unbalanced propulsive forces being applied to the tube to increase vibration and whipping thereof. Such diametrically unopposed or asymmetrically arranged and oriented apertures would result in improved distribution of the ejected material together with reduced aperture clogging.

What I claim is:

1. An ammoniating sparging device for distributing ammoniating liquids under pressure into a bed of phosphatic materials formed in apparatus for manufacturing ammonium phosphate fertilizer compositions, said sparging device comprising:
   a. a perforated flexible tube which provides multiple discharge orifices for the ammoniating liquid,
   b. said tube being made of elastic material chemically resistant to reaction with anhydrous ammonia,
   c. one end of the tube being open and the opposite end being closed,
   d. said tube being secured at said open end, to an ammoniating liquid feed pipe and being in communication therewith to receive a pressurized flow of ammoniating liquid therefrom,
   e. the unsecured portion of said tube being free to flex and move in different radial directions relative to the bed of phosphatic materials,
   f. said multiple discharge orifices being formed in the sidewall of the unsecured part of the tube, and arranged longitudinally and circumferentially thereof, between its open and closed ends,
   g. the flow of ammoniating liquid from said feed pipe into said tube and through said orifices being under sufficient pressure to cause the unsecured portion of the tube to flex and move from areas of higher to lower density in said bed of phosphatic materials,
   h. to free the tube from salt deposits, and
   i. to provide infinite loci of distribution of the ammoniating liquid.

2. A sparging device in accordance with claim 1, wherein:
   a. said tube has a fixed end and a free end opposite said fixed end,
   b. said fixed end being the open end secured to the ammoniating liquid feed pipe,
   c. said free end being the closed end.

3. A sparging device for discharging materials under pressure in accordance with claim 1, wherein:
   a. said tube has fixed opposite ends and a movable portion between its ends,
   b. one of said fixed ends being its open end which is secured to the ammoniating liquid feed pipe,
   c. the opposite fixed end being its closed end and being secured to a support provided opposite said feed pipe.

4. A sparging device in accordance with claim 3, wherein:
said tube is secured attached intermediate its fixed ends to flexible movement-limiting means which allows the intermediate portion of the tube between its fixed ends to flex and move under the pressure of the ammoniating liquid discharging therefrom, but confines the flexing and movements thereof to predetermined limits of amplitude.

5. A sparging device in accordance with claim 4, wherein:
said movement-limiting means comprises a slack flexible supporting cable which is supported at both ends and is attached intermediate its said ends to the intermediate portion of the tube.

6. A sparging device in accordance with claim 1, wherein:
the apertures orifices of said perforated tube are disposed symmetrically arranged circumferentially of the tube to provide symmetrical ejection of said materials the ammoniating liquid.

7. A sparging device in accordance with claim 1, wherein:
the orifices of said perforated tube are asymmetrically disposed arranged circumferentially of the tube to exert unbalanced asymmetrical jet forces against said tube.